United States Patent Office 3,232,793
Patented Feb. 1, 1966

3,232,793
RAW CANE SUGAR RECOVERY PROCESS
Benjamin A. Bourne and Philip S. Francis, Clewiston, Fla., assignors to United States Sugar Corporation, Clewiston, Fla., a corporation of Florida
No Drawing. Filed Apr. 30, 1963, Ser. No. 277,012
6 Claims. (Cl. 127—50)

This application is a continuation-in-part of application Ser. No. 100,776, filed Feb. 21, 1961, now abandoned.

The present invention relates to an improved process for producing raw sugar and more particularly to a process including the steps of refining or purifying raw sugar cane juices as initially obtained from sugar cane stalks; a subsequent improved separation of sugar-bearing juices from a precipitate separated from the purified raw sugar cane juices with a concomitant reduction in the quantity of such precipitate formed; the concentration of said purified raw sugar cane juices by evaporation with concomitant reduction in the formation of and chemical cost of removing scale deposit; the crystallization of the concentrated raw sugar cane juices; the separation of a molasses by-product from said crystallized sugar cane juices and the manipulation of said separated molasses.

Many methods have been proposed for producing raw sugar. These methods involve, for instance, purification of raw sugar cane juices. The object of such procedures is to prevent sucrose inversion, eliminate non-sugars such as suspended matter, proteins, colloids, dark colored susbtances, waxes and the like since all of these adversely affect both the quantity and quality of the sugar ultimately recovered.

Since it is important that the cost of production be kept at a minimum, most methods commonly practiced today employ milk of lime, because of its cheapness, as the principal chemical in the initial stages of producing the raw sugar, i.e. in a purification step for treating the acid mixed sugar cane juice prior to heating to the boil in order to prevent inversion of sucrose and effect coagulation and precipitation of colloidal and suspended matter so as to produce a reasonably clear limpid solution for evaporation. There are many disadvantages in using milk of lime, not only in the purification step but also in subsequent operations of the overall method for producing a raw sugar. The principal disadvantage associated with its use in a purification procedure is the tremendous increase in calcium content of the clarified juices following its use. In some cases there is an increase of 55% or more in calcium content. Disadvantages in such subsequent operations are experienced when, for instance, using otherwise very desirable cane varieties having juices especially high in calcium salts and phosphates. The additional use of milk of lime for clarification results in clarified juices with such high concentrations of calcium salts, especially the sulfate, that extremely heavy scale deposits occur in evaporation bodies and the cost of removing the same either mechanically or chemically is substantial. For example, a raw sugar mill in the Florida Everglades using lime as a clarifying agent at a cost of 1.28 cents per ton of cane, spends over 4.53 cents per ton of cane for evaporator cleaning chemicals alone. Since the most desirable process for purifying raw sugar juices must not only accomplish this task satisfactorily, but do so at a minimum overall expense for sugar production, the initial low cost of the treating chemical can be misleading as to its suitability. This is particularly so if it results in heavy evaporator scaling which is difficult and expensive to remove. Furthermore, heavy scaling reduces evaporator efficiency very rapidly and the lost time involved for frequent cleaning becomes expensive, both in terms of manpower and daily output of sugar.

As yet another example, calcium hydroxide is known to react with some of the cane sugar itself to produce an insoluble calcium saccharate which often becomes trapped in the precipitated insoluble non-sugar solids, commonly referred to as "filter cake" and is lost when the filter cake is removed from the clarified juice. It has been determined that the calcium saccharate loss accounts for over 8 percent more sucrose loss than if this reaction did not occur. Further, it has been found that the amount of filter cake produced in processes employing milk of lime is exceptionally high and since each pound of filter cake discarded involves a discard of an appreciable quantity of cane sugar in the liquid associated with the cake or precipitate, uneconomically high losses of raw sugar are experienced.

In addition to the above described disadvantages attendant with existing raw sugar recovery methods, uneconomic losses of the desired product are experienced by a failure heretofore to successfully recover valuable cane sugar from the precipitate or filter cake described above. In spite of using the most modern continuous rotary vacuum filters valuable cane sugar was nevertheless lost in the precipitate. Moreover conventional raw sugar recovery methods, especially in the final stages, suffer a disadvantage in that the period required for crystallization of the sugar in the massecuite is of such a duration that often inversion and damage of the sugar occur with the result of a lower product recovery than expected. One important factor during this operation is the viscosity of the final molasses produced. It is known that the viscosity of the molasses is directly proportional to the viscosity of the massecuite and the higher the viscosity of the latter, the longer the evaporation cycle. The viscosity of the molasses produced also has a direct bearing on the rate of its removal from the raw sugar crystal and existing methods require expensive and time consuming operations to effect the removal of a molasses film which coats the raw sugar crystal.

In an attempt to avoid the disadvantages of the use of milk of lime as the sole material for hydrogen ion concentration adjustment and for clarification, magnesium oxide and hydroxide as a mixture have been proposed by Naugle in United States Patents 2,422,699 and 2,515,-353. Moreover, the use of a mixture of magnesium oxide and calcium oxide is employed in the "Elguanite Process," which is described in Naugle et al. United States Patent No. 2,441,281. Such process has not, however, proven completely satisfactory. For example, it requires a double clarification procedure which is rather tedious and uneconomical. Hence, it has not been adopted by the industry. Nevertheless, the milk of lime process has for the most part remained a standard procedure in processes for producing raw sugar especially in the initial stages of the process when raw mixed cane juice is treated with this reagent to adjust its normally acid condition to a pH of about 8 before further processing techniques such as heating and precipitation in order to remove most of the insoluble, non-sugar solids. However, a variety of disadvantages, as described above, are attendant with its use and therefore it is a prime object of the instant invention to overcome the many disadvantages and adverse side effects associated with the milk of lime technique.

It is an object of the present invention to develop an improved process for the purification of raw sugar cane juices.

Another object of the present invention is to develop a process to reduce substantially the amount of precipitate formed during the neutralization or clarification procedure in the production of raw sugar.

An additional object of the present invention is to reduce substantially the clarified sugar solution remaining in the precipitate formed.

A further object is to reduce calcium scaling of evaporators and other sugar cane juice concentrating equipment.

A still further object is to shorten the period required for the crystallization of the raw sugar in the massecuite.

Yet another object is to improve the rate of separation of the raw sugar crystals from the massecuite.

A still further object is to produce a by-product molasses which may be handled with greater facility thereby effecting a substantial decrease in, for instance, expenditures required for its transportation.

Still further objects and the entire scope of applicability of the present invention will become apparent from the detailed description given hereinafter; it should be understood, however, that the detailed description and specific examples, while indicating preferred embodiments of the invention, are given by way of illustration only since various changes and modifications within the spirit and scope of the invention will become apparent to those skilled in the art from this detailed description.

In the instant development there is preferably employed in the initial procedure, i.e. the clarification of raw sugar cane juices, magnesium hydroxide alone rather than a mixture of magnesium and calcium hydroxides. Magnesium hydroxide which has not previously been subjected to heating or calcining is superior to commericaly available grades of heated magnesium hydroxide and calcined magnesium oxide. Additionally, it can be used at a substantially lower cost on a MgO basis for clarification purposes.

It is conveniently supplied as a thick, but not compact aqueous slurry, containing approximately 50% $Mg(OH)_2$ (or 34.3% MgO). It is readily transferred from tank car to storage tanks by a pump and can be easily diluted with water and remain in suspension therein for long periods without settling out to a hard, compact mat as occurs with heated or calcined magnesium hydroxide and calcined magnesium oxide slurries. Furthermore, it is much more highly reactive than calcined magnesium hydroxide or oxide and more quickly neutralizes the raw, cold, mixed sugar cane juice than MgO slurries do and in addition it does not settle rapidly until coagulated by heat.

In accordance with the present process there is first added to the cold, raw, mixed cane juice a mixture of sodium aluminate (Nalco 680) and caustic soda, preferably in the ratio of 8 to 1. As a specific example they are added as an aqueous solution containing 10% sodium aluminate and 1.25% caustic soda. In place of caustic soda there can be used potassium hydroxide. The proportions of caustic can be varied widely and in some instances omitted.

The quantity of this mixture added to the juice will vary somewhat, depending on the variety of cane and the amount of suspended solids therein. In general, there are added about 50 to 120 parts of sodium aluminate and 6.25 to 15 parts of caustic soda per million parts of juice. In the illustrative example there are employed 100 parts of sodium aluminate and 12.5 parts of caustic soda per million parts of juice. There is then added sufficient noncalcined or previously unheated 10% $Mg(OH)_2$ slurry to bring the pH to 7.1 to 7.2. In the specific example 0.70 gallons of 10% $Mg(OH)_2$ slurry are employed per 214 gallons of mixed juice derived from a ton of cane subsequent to the sodium aluminate-caustic soda pretreatment. The concentration of $Mg(OH)_2$ can be varied, but a 10% aqueous slurry having a Baumé of 8.1 is preferred.

After this treatment the juice is passed through the juice heater and brought to the boil. Just before discharge of the heated juice to the clarifier, a polyelectrolyte is added. Advantageously, the polyelectrolyte may be added in amounts of about 1 to 2 p.p.m. The best proportions for most juices consists of concentrations of Separan AP-30 at about 1.5 p.p.m. Such is used in the specific example.

The polyelectrolyte Separan AP-30 is a synthetic, high molecular weight water-soluble polymer which contains both amide and carboxylic groups. It is a copolymer of the sodium salt of acrylic acid with acrylamide, and has the approximate formula for the repeating unit:

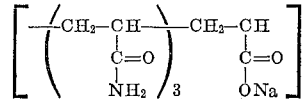

The polyelectrolyte Separan AP-30 acts as an anionic polyelectrolyte in neutral and alkaline solution but under acidic conditions the ionization is repressed and the polymer then assumes a nonionic character. This polymer acts as a powerful flocculating agent and greatly facilitates the setting and filtration rates of dispersed solids.

Polymeric materials containing ionizable functional groups are referred to generically in the art as polyelectrolytes. They undergo molecular dissociation when going into solution and thus, exhibit abnormal osmotic pressures.

The polyelectrolyte may be applied at the same time or separately to the juice stream entering the clarifier. Following its addition, no vigorous agitation should be given. Very rapid coagulation, flocculation and equally rapid settling occurs and the result is that a light colored, clear, clarified juice having a pH of 6.7 to 6.8 is produced for delivery to the evaporators. The final pH adjustment with non-calcined magnesium hydroxide before heating is regulated to give a clarified juice in the pH range of 6.5 to 7.0. For best results the clarified juice has a pH range of 6.8 or very slightly lower, i.e. 6.7. During evaporation to syrup the pH drop is not significantly different from that which occurs in the case of the lime process or to 6.2 or 6.3. Considering the substantially smaller quantity of alkali used for the initial pH adjustment to 7.1 or 7.2 in the case of the new process, this drop in pH is remarkably small, or approximately 1.0 point. In the case of the lime process, the initial pH adjustment of raw mixed juice is 8.0 and therefore the total drop to accomplish 62° Brix syrup is approximately 1.8 points, or 80 percent greater. The new process, therefore, by avoiding the exposure of the sugar solution to a pH level much above the neutral point of 7.0 prevents the production of the well known objectionable colored substances, or so-called "melanoidin compounds" under the action of boiling temperatures on the reducing sugars present. In fact, the action of excess alkali materials such as lime, on sugars in solution at boiling temperatures results in the formation of formic, acetic and oxalic acids which are all capable of causing sucrose inversion.

The quantity of $Mg(OH)_2$ required for best results with the usual mixed raw cane juices varies from 0.45 to 0.55 part (MgO basis) per part of CaO required to produce clarified juice of pH 7.0 when 50 p.p.m. of $H_3PO_4$ (as $P_2O_5$) is used ahead of liming. Uncalcined MgO or calcined MgO can be substituted for the uncalcined $Mg(OH)_2$ but the use of such materials increases the cost of the process, requires expensive mixing facilities to make slurries and requires special continuous agitation to prevent settling into a hard cake.

Comparative pilot plant tests using the usual lime clarification and the process of the present invention have shown that the calcium content of the clarified mixed juices produced according to the instant invention averaged approximately 251 p.p.m. or about 43 percent lower than those produced in the regular lime process, which juices averaged about 440 p.p.m. in calcium.

While the sodium aluminate-caustic soda mixture is preferably added to the cane juices before adding the magnesium hydroxide to bring about the final pH adjustment, it is also possible to include the sodium aluminate and caustic soda with the magnesium hydroxide or non-calcined magnesium oxide slurry and thus apply all three chemicals simultaneously in order to obtain equally good clarifying results. Specifically 24 parts of $Mg(OH)_2$ can be mixed with 8 parts of sodium aluminate and 1 part of sodium hydroxide can be made into an aqueous solution and then added to the cane juice prior to bringing the same to a boil to provide 100 p.p.m. sodium aluminate and 12.5 p.p.m. sodium hydroxide and 300 p.p.m. magnesium hydroxide.

When substituting calcined or non-calcined magnesium oxide for the non-calcined magnesium hydroxide, the process is the same except that 1 part of MgO is used for each 1.446 parts of $Mg(OH)_2$. The magnesium oxide must first be prepared as an approximately 10% aqueous slurry and agitated to prevent settling before application to the cane juice.

Since sodium aluminate is also available in liquid solutions (such as Nalco No. 2) containing 43.26% less $Al_2O_3$ by weight than the solid commercial sodium aluminate (Nalco 680), but whose delivered cost closely approximates that of the latter on the basis of active ingredients, its use is preferred because of ease of handling, elimination of operation of dissolving the solid product in water and the fact that no caustic soda is required for its use since the product already contains an increased ratio of $Na_2O$ to $Al_2O_3$ of 31.3%, which amply provides for its stability in storage. Substitution of the liquid sodium aluminate containing 19.9% $Al_2O_3$ is on the basis of 2.312 parts to 1 part of solid sodium aluminate (Nalco 680) which contains 48.0% $Al_2O_3$.

Unless stated otherwise, all parts and percentages are by weight.

Subsequent to the clarification procedure, the clarified juices are generally sent to evaporator units and the precipitated insolubles separated from the clarified raw juices are usually discarded. The present invention employing as it does $Mg(OH)_2$ or hydrated magnesium oxide utilizes substantially less of this regent per ton of cane per ton of mixed raw cane juice than milk of lime owing to the fact that only 0.72 part of MgO are equivalent to 1 part of CaO in acid neutralizing power. The result is that substantially less precipitate or filter cake is produced per ton of cane processed. Tests have shown that a greater quantity of filter cake when using the lime process results in a loss of about 0.2624 lb. of raw sugar per ton of cane. In addition to the substantial savings secured by a reduction of the quantity of filter cake produced, a further advantage is secured according to the method of the instant invention by reducing substantially the volume of clarified sugar solution, i.e. a solution of raw sugar juice remaining in the precipitate. In order to accomplish this recovery it has been found advantageous to add about 80–120, preferably 90–110 p.p.m of 80% phosphoric acid to the precipitate. If necessary, the pH may be adjusted by the addition of a basic medium to about 7.0–7.1 which has been determined experimentally as the isoelectric point. This is the hydrogen ion concentration level at which the precipitate mixture shows minimum conductivity, osmotic pressure and viscosity. At this level, the colloidal particles in the precipitate move toward neither electrode and consequently release the sugar solution therein at the most rapid rate, which greatly enhances filtration speed. For instance, a small quantity of $Ca(OH)_2$ may be used. Subsequently, coagulating and rapid flocculating amounts of the polyelectrolyte Separan AP–30 are added to the precipitate. Ordinarily this amount will be about 6–10 p.p.m., preferably about 8 p.p.m. Substantially all of the raw sugar juice in the precipitate is recovered by this procedure.

After discharge from the clarifiers and separation from the filter cake, the mixed clarified sugar cane juice is delivered to evaporators where the operation of which according to the present invention involves reducing the clarified sugar juice to syrup of about 60–62° Brix, preferably about 62° Brix with a substantial reduction in the formation of scale and concomitant increase in effectiveness of heat transfer area available, heat transfer rate and decrease in expenditures required to remove any scale formed. It has been known that when employing conventional lime processes the equipment, especially the evaporating units, become badly scaled after a little over 50 hours of operation to the extent that the rate and efficiency of evaporation are seriously reduced. However, when the instant invention is practiced it was found that it was possible to extend the period of use of such equipment to more than about 230 hours, thus greatly improving evaporation efficiency and also significantly reducing the cost of reagents necessary to remove the scale. Existing data show that a saving of $0.0137 per ton of cane milled for such scale-removing reagents is effected when practicing the instant invention compared to the cost of such reagents when employing, for instance, a conventional milk of lime process.

Subsequent to the evaporation process which, as stated, usually results in about a 62° Brix syrup, the syrup is sent to high vacuum evaporating vessels known as vacuum pans. The instant invention provides for a substantial reduction in the period required for crystallization of the cane sugar in the massecuite. Hence, there is less time for exposure to inversion and damage so that a higher recovery is experienced. The syrup is generally evaporated in vacuum pans using about a 25 to 27 inch vacuum (mercury basis) to obtain a massecuite of about 90–100° Brix, preferably about 94° Brix. The rate of production of sugar crystals has been found to be inversely proportional to the viscosity of the massecuite, i.e. the higher the viscosity, the slower the rate. It was also fund that the viscosity of a molasses component of the massecuite is directly proportional to the viscosity of the massecuite and, in addition, that the viscosity of a final molasses when employing a conventional milk of lime process is substantially higher than that produced when employing the instant invention. As a specific example while processing with lime, a final molasses averaged 770 cp. absolute viscosity at 70° C. while a final molasses resulting from a practice of this invention averaged only 580 cp. absolute viscosity at 70° C., or 25 percent lower. Because of the lower massecuite viscosity, a substantial reduction in the evaporation cycle was experienced.

The massecuite produced in the vacuum pans is then cooled and agitated gently in special crystallizer units which permit further crystal growth of the cane sugar before it is centrifuged in large perforate baskets in order to separate the raw sugar crystals therefrom. Ordinarily it has been found that repeat aqueous washing operations in the centrifuges are involved in conventional milk of lime processes. However, it was found that a more effective separation is achieved in accordance with the practice of this invention which results in the production of a high grade raw sugar without having to wash any but the last amounts of recovered or so-called "C" sugar. Because of the substantial reduction of viscosity of the massecuite, raw sugar may be separated from the lower viscosity product by, for instance, centrifugation, in a shorter period of time than in a conventional milk lime process and yet give a polarization of 98% sucrose or better. This procedure then not only secures a savings in operational expenditures such as labor and time but it permits an even greater output of raw material through existing plant facilities.

The resulting raw sugar crystals are usually sent to refining procedures. However, an additional advantage is secured by the practice of the instant invention in the disposition of the by-product molasses separated from the raw sugar crystals. Because of its lower viscosity, as discussed above, substantially less power at the usual handling temperatures to pump the molasses to storage or for direct shipment is required than for a molasses resulting from a standard lime process.

In the following illustrative examples all parts and percentages are by weight.

*Example 1*

To 1,000,000 parts of raw sugar cane juice there were added 100 parts of sodium aluminate (as a 10% aqueous solution prepared with the solid form of sodium aluminate) and 12.5 parts of caustic soda (as a 2.5% aqueous solution). There was then added 0.70 parts by volume of 10% aqueous $Mg(OH)_2$ (8.1° Baumé) for each 214 parts by volume of the sugar cane juice to adjust the pH to 7.1–7.2. The juice was brought to a boil and there was then added 1.5 p.p.m. of Separan AP–30. The Separan AP–30 was added as a 0.05% aqueous solution. The mixture was then discharged to the clarifier. Very rapid coagulation, flocculation and rapid settling occurred. The light colored, clear, clarified juice had a pH of 6.8 and was delivered after separation from the precipitate to the evaporators where it was evaporated to syrup of 62° Brix. The 62° Brix product had a pH of 6.2–6.3.

*Example 2*

The procedure of Example 1 was repeated except that there was added to the 1,000,000 parts of raw sugar cane juice an aqueous mixture containing 100 parts sodium aluminate of the solid form, 12.5 parts of sodium hydroxide and 300 parts of magnesium hydroxide in place of the separate addition of the sodium aluminate-caustic soda and the magnesium hydroxide. The pH of the cane juice was adjusted to 7.1 as a result of the simultaneous addition of the three materials.

*Example 3*

To 1,000,000 parts of raw sugar cane juice there were added 100 parts of sodium aluminate after dilution of the liquid from (Nalco No. 2) so as to obtain a 10% aqueous dilution based on the equivalent $Al_2O_3$ content contained in the solid form used in Example 1, i.e. 2.312 parts by weight of liquid sodium aluminate Nalco No. 2 is equal to 1 part of Nalco 680, sodium aluminate. There was then added 0.70 part by volume of 10% aqueous $Mg(OH)_2$ for each 214 parts by volume of the sugar cane juice to adjust the pH to 7.1–7.2. The juice was brought to a boil and there was then added 1.5 p.p.m. of Separan AP–30 which was added as a 0.05% aqueous solution. The mixture was then discharged to the clarifier. Very rapid coagulation, flocculation and rapid settling occurred. The light colored, clear, clarified juice had a pH of 6.8 and was delivered to the evaporators where it was evaporated to syrup of 62° Brix. The 62° Brix product had a pH of 6.2–6.3.

The 62° Brix syrup was sent to a high vacuum evaporation vessel where it was evaporated in vacuum pans using 25″–27″ vacuum (mercury basis) to obtain a massecuite of about 94° Brix which was then passed through crystallizer units to provide both agitation and cooling effects to promote maximum crystal growth. A final molasses was produced averging 580 cp. absolute viscosity at 70° C. which was separated from the sugar crystals produced by centrifiugation to produce sucrose with a polarization of 98% or better. The separated molasses was then conveniently pumped to storage.

To the precipitate separated from the clarified raw sugar cane juice which is fed directly to the first evaporator units for syrup production, there was added about 100 p.p.m. of 80% phosphoric acid with thorough mixing. The pH of the mixture was adjusted to about 7.0–7.1 by the addition of a small quantity of $Ca(OH)_2$. To the mixture there was added approximately 8.1 p.p.m. of Separan AP–30. Very rapid coagulation followed with release of the trapped clarified sugar cane juices which were then sent to the evaporator unit described above.

What is claimed is:

1. In a method for producing raw sugar from raw sugar cane, the steps which comprise purifying the juice from said raw sugar cane comprising adding to said raw juice sodium aluminate in an amount of 50 to 120 parts, and sodium hydroxide in an amount of 6.25 to 15 parts per million of said raw juice, thereafter adding substantially non-calcined magnesium hydroxide to adjust the hydrogen ion concentration, heating said mixture substantially to the boiling point and adding carboxyl containing anionic water-soluble polyelectrolyte to produce a primary clarified juice and a first precipitate, said first precipitate consisting essentially of insoluble non-sugar solids and clarified sugar solution, separating said primary clarified juice from said first precipitate, separating said clarified sugar solution from said first precipitate comprising adding to said first precipitate 80% phosphoric acid in amounts of about 80 to 120 p.p.m. of said first precipitate, adjusting to pH 7.0–7.1 with lime, adding a polyelectrolyte consisting essentially of a copolymer of acrylamide and acrylic acid in amounts of about 6–10 p.p.m. of said first precipitate to produce a second precipitate and said clarified sugar solution, evaporating said primary clarified juice and said separated clarified sugar solution to syrup, further evaporating said syrup to produce raw sugar crystals suspended in massacuite and separating said massecuite into raw sugar and molasses.

2. The process of claim 1 wherein said primary clarified juice and said clarified sugar solution are evaporated to syrup of about 60–62° Brix.

3. The process of claim 2 wherein said syrup is heated under a vacuum of about 25 to 27 inches of Hg to obtain a massecuite of about 94° Brix comprising raw sugar crystals and associated molasses.

4. A method for producing raw sugar from raw sugar cane the steps which comprise purifying the juice from said cane comprising adding about 100 parts of sodium aluminate and 12.5 parts of caustic soda per million parts of juice, subsequently adding substantially non-calcined magnesium hydroxide in amounts sufficient to adjust the pH of the juice to about 7.1 to 7.2, heating said juice substantially to the boiling point, adding to the heated juice a polyelectrolyte consisting essentially of a copolymer of acrylamide and acrylic acid in amounts of about 1.5 p.p.m. of said juice to produce a primary clarified juice and a precipitate, said precipitate consisting essentially of insoluble non-sugar solids and clarified sugar solution, separating said primary clarified juice from said precipitate, adding 80% phosphoric acid in amounts of about 90–100 p.p.m. of said precipitate, adjusting the pH to 7.0–7.1, the isoelectric point, with lime and a polyelectrolyte consisting essentially of a copolymer of acrylamide and acrylic acid in amounts of about 8 p.p.m. to produce a second precipitate and said clarified sugar solution, evaporating said primary clarified juice and said separated clarified sugar solution from said precipitate to syrup of about 62° Brix, heating said syrup under a vacuum of about 25 to 27 inches of Hg to obtain a massecuite comprising raw sugar crystals and a molasses of about 94° Brix and separating said molasses to obtain raw sugar.

5. The process of purifying raw sugar cane juices comprising adding to the raw juices sodium aluminate in amounts of 50 to 120 parts per million based on said raw juice together with sodium hydroxide in an amount of 6.2 to 15 parts per million of said raw juice and a member selected from the group consisting of magnesium hydroxide and non-calcined magnesium oxide to adjust the hydrogen ion concentration.

6. The process according to claim 5 wherein said sodium aluminate together with sodium hydroxide and said member are added to said raw juices in an amount sufficient to adjust the pH thereof between 7.1 and 7.2.

(References on following page)

References Cited by the Examiner

UNITED STATES PATENTS

| | | | |
|---|---|---|---|
| 1,887,879 | 11/1932 | Wayne | 127—48 X |
| 2,422,699 | 6/1947 | Naugle | 127—50 |
| 3,079,331 | 2/1963 | Gieseke | 210—53 |

FOREIGN PATENTS

| | | |
|---|---|---|
| 1,095,926 | 12/1954 | France. |
| 190 | 1877 | Great Britain. |

OTHER REFERENCES

Betz: Handbook of Industrial Water Conditioning, 5th ed., 1958, Betz Laboratories, Inc., Philadelphia, Pa., p. 10.

Honig: Principles of Sugar Technology, 1953, Elsevier Publ. Co., New York, pp. 572–581.

Spencer-Meade: Cane Sugar Handbook, 8th ed., 1945, John Wiley & Sons, Inc., New York, pp. 69–72, 153–155, 196 and 203.

MORRIS O. WOLK, *Primary Examiner.*